(12) United States Patent
Toyama et al.

(10) Patent No.: US 7,979,718 B2
(45) Date of Patent: Jul. 12, 2011

(54) OPERATOR RECOGNITION DEVICE, OPERATOR RECOGNITION METHOD AND OPERATOR RECOGNITION PROGRAM

(75) Inventors: Soichi Toyama, Tsurugashima (JP); Ikuo Fujita, Kawagoe (JP); Mitsuya Komamura, Tsurugashima (JP)

(73) Assignees: Pioneer Corporation, Tokyo (JP); Tech Experts Incorporation, Tokyo (JP)

( * ) Notice: Subject to any disclaimer, the term of this patent is extended or adjusted under 35 U.S.C. 154(b) by 945 days.

(21) Appl. No.: 11/910,415

(22) PCT Filed: Mar. 24, 2006

(86) PCT No.: PCT/JP2006/305939
§ 371 (c)(1),
(2), (4) Date: Oct. 1, 2007

(87) PCT Pub. No.: WO2006/109515
PCT Pub. Date: Oct. 19, 2006

(65) Prior Publication Data
US 2009/0254757 A1    Oct. 8, 2009

(30) Foreign Application Priority Data
Mar. 31, 2005    (JP) .................................. 2005-101369

(51) Int. Cl.
*H04K 1/00* (2006.01)
*H04L 9/00* (2006.01)
(52) U.S. Cl. ........ 713/186; 713/182; 382/124; 382/182; 704/246; 704/254

(58) Field of Classification Search .................. 713/186; 704/254; 382/182
See application file for complete search history.

(56) References Cited

U.S. PATENT DOCUMENTS

| | | | | |
|---|---|---|---|---|
| 6,393,139 | B1 * | 5/2002 | Lin et al. | 382/124 |
| 6,868,382 | B2 * | 3/2005 | Shozakai | 704/254 |
| 7,054,814 | B2 * | 5/2006 | Okutani et al. | 704/256.4 |
| 7,376,566 | B2 * | 5/2008 | Aizawa et al. | 704/275 |
| 2004/0243412 | A1 * | 12/2004 | Gupta et al. | 704/254 |

FOREIGN PATENT DOCUMENTS

| | | |
|---|---|---|
| JP | 57-141700 A | 9/1982 |
| JP | 03-010298 A | 1/1991 |
| JP | 09-006387 A | 1/1997 |
| JP | 2001-195574 A | 7/2001 |
| JP | 2002-297181 A | 10/2002 |
| JP | 2004-294755 A | 10/2004 |

* cited by examiner

*Primary Examiner* — Nasser Moazzami
*Assistant Examiner* — Fikremariam Yalew
(74) *Attorney, Agent, or Firm* — Sughrue Mion, PLLC

(57) ABSTRACT

An operator recognition device is provided that eliminates the registration of data such as HMM data having a characteristic amount for which error in recognition occurs easily when recognizing an operator, and thus reduces the possibility of errors in recognition, and has stable recognition performance. When registering HMM data that is used when performing recognition processing, a speaker recognition device 100 eliminates the registration of HMM data of a password having a characteristic amount of the spoken voice component that is similar to a characteristic amount that is indicated by HMM data that is already registered, and does not allow the registration of HMM data for which it is estimated that error in recognition will occur easily during the recognition process.

12 Claims, 6 Drawing Sheets

OPERATOR RECOGNITION DEVICE, OPERATOR RECOGNITION METHOD AND OPERATOR RECOGNITION PROGRAM

CROSS REFERENCE TO RELATED APPLICATIONS

This application is a National Stage of International Application No. PCT/JP2006/305939 filed on Mar. 24, 2006, claiming priority based on Japanese Patent Application No. 2005-101369, filed Mar. 31, 2005, the contents of all of which are incorporated herein by reference in their entirety.

TECHNICAL FIELD

The present invention relates to a technique for performing speaker recognition using HMM (Hidden Markov Models).

BACKGROUND ART

Currently, with the development of networks such as the Internet and the development of computers, various methods and systems have been researched and developed for identifying a person in various situations such as providing services using a network, accessing another computer, or as an alternate to a physical key.

As a typical example of this kind of person identification, is a method (hereafter, ref erred to as an 'operator recognition method') that uses biological information about the operator such as spoken voice components or fingerprints, and more specifically, a characteristic amount of biological information such as spoken voice components or fingerprints of operators to be identified are registered in advance, and when identifying an operator, biological information that is input is extracted, and the extracted characteristic amount that is extracted is compared with the characteristic amount that was registered in advance to identify the operator.

For example, a method is known for identifying a person using the spoken voice component of an operator (hereafter, referred to as a speaker) that uses a probability model called HMM (Hidden Marcov Model) (hereafter, referred to as HMM). Particularly, recently a highly recognizable text dependent type recognition method is known that uses HMM data, in which the processing load of recognition is reduced by reducing the amount of HMM data that is registered in advance (hereafter referred to as HMM data).

More specifically, in this kind of text dependent operator recognition system (hereafter, referred to as a text dependent speaker recognition system) HMM for each speaker is calculated from a characteristic amount that is extracted from a plurality of times of speaking a word or phrase (hereafter, called the 'password') that is arbitrarily set for each operator, or in other words, speaker in advance, and registering the result as HMM data in a database, and when performing recognition for that speaker, speaker recognition is performed by having the speaker say the password and comparing a characteristic amount of that spoken voice component with the characteristic amount indicated by the HMM data (see Japanese patent application 2004-294755).

DISCLOSURE OF THE INVENTION

Problems to be Solved by the Invention

However, in the prior operator recognition method that uses biological information, as typical in a text dependent recognition system, when HMM data that are registered beforehand resembles other registered HMM data, errors in recognition occur often. For example, in a text dependent speaker recognition system, when the character strings of the arbitrarily set passwords for each speaker are similar, and the speech characteristics of the speakers are similar, errors in recognition occur.

In order to solve the problem described above, the object of the present invention is to provide an operator recognition device, operator recognition method and operator recognition program that eliminates the registration of data such as HMM data having characteristic amounts for which errors in recognition could easily occur, further reduces the possibility of errors in recognition and has stable recognition performance.

Means for Solving the Problems

To solve the problems, one aspect of the invention is an operator recognition device having a database in which biological information for comparison, for which registration can be changed and that is obtained from biological information for each operator that is the object of recognition, is registered in advance, and that recognizes an operator by comparing biological information of the operator to be identified with the biological information for comparison, is provided with: an input device for inputting biological information to be registered when registering the biological information in the database as biological information for comparison; a comparison-target information generation device for generating comparison-target information for comparison with the biological information for comparison that is registered in the database based on biological information that was input to the input device; a calculation device for comparing the generated comparison-target information and all of the biological information for comparison, and calculating the likelihoods for both the generated comparison-target information and all of the biological information for comparison; and an update device for using the comparison-target information to update the database only when the calculated likelihoods are equal to or less than a reference likelihood.

Also, another aspect of the invention is an operator recognition method for recognizing an operator by comparing biological information for comparison for which registration can be changed and that is obtained from biological information that is registered in a database in advance for each operator that will be the object of recognition, and biological information of an operator to be identified, is provided with: a comparison-target information generation process of acquiring biological information to be registered, and generating comparison-target information for comparison with the biological information for comparison that is registered in the database based on the acquired biological information when registering the biological information in the database as biological information for comparison; a calculation process of comparing the generated comparison-target information with all of the biological information for comparison, and calculating the likelihood for both the generated comparison-target information and all of the biological information for comparison; and a update process of updating the database using the comparison-target information on when the calculated likelihoods are equal to or less than a reference likelihood.

Also, further aspect of the invention is an operator recognition program for recognizing an operator by a computer by comparing biological information for comparison, for which registration can be changed and that is found from biological information that is registered in advance for each operator that is the object of recognition, with biological information for an operator that is to be identified, and that makes the computer function as: a comparison-target information generation device for acquiring biological information to be registered, and generating comparison-target information for comparison with the biological information for comparison that is registered in the database based on the acquired biological information when registering the biological information in the database as biological information for comparison; a calculation device for comparing the generated comparison-target information with all of the biological information for comparison, and calculating the likelihood for both the generated comparison-target information and all of the biological information for comparison; and an update device for updating the database using the comparison-target information on when the calculated likelihoods are equal to or less than a reference likelihood.

Figure 1:
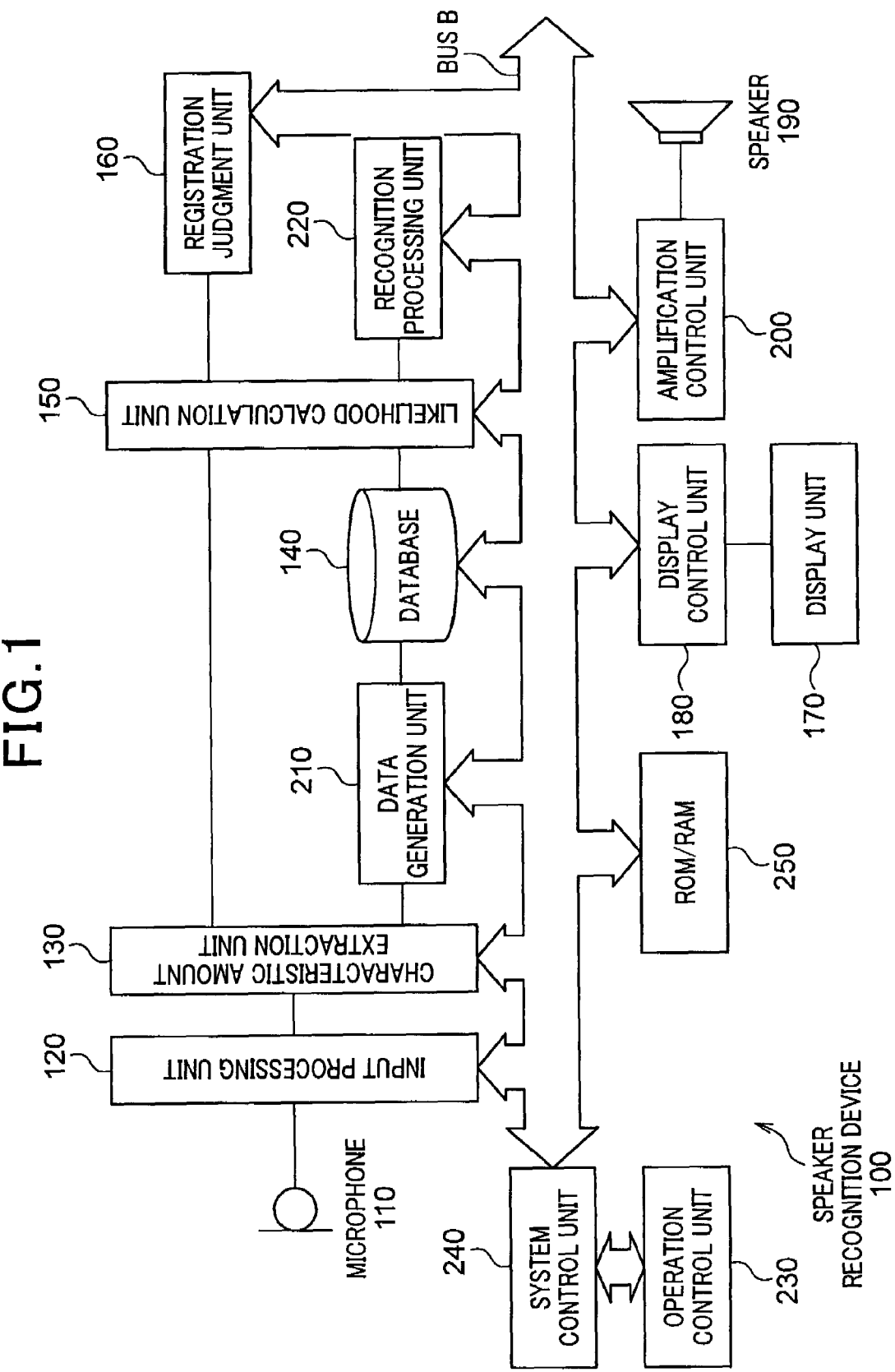
FIG. 1 is a block diagram showing the construction of a speaker recognition device of a first embodiment of the operator recognition device of the present invention.

EXPLANATION OF LETTERS OR NUMERALS 100,500 . . . speaker recognition device
110 . . . microphone
120 . . . input processing unit
130,320 . . . characteristic amount extraction unit
140,330 . . . database
150,340,520 . . . likelihood calculation unit
160 . . . registration judgment unit
170 . . . display unit
180 . . . display control unit
190 . . . speaker
200 . . . amplification control unit
210,360,510 . . . data generation unit
220,350 . . . recognition processing unit
230 . . . operation control unit
240,370,530 . . . system control unit
250 . . . ROM/RAM
300 . . . fingerprint recognition device
310 . . . fingerprint detection unit

BEST MODE FOR CARRYING OUT THE INVENTION

Next, the preferred embodiments of the present invention will be explained based on the drawings.

The embodiments explained below are embodiments in which the operator recognition device, operator recognition method and operator recognition program of the present invention are applied to a text dependent speaker recognition device (hereafter, simply referred to as a 'speaker recognition device) or a fingerprint recognition device. Also, in the embodiments below, the likelihood values and threshold values are presumed to be normalized values.

Embodiment 1

First, based on FIG. 1 and FIG. 2, a first embodiment of the operator recognition device of the invention will be explained using a speaker recognition device.

First, FIG. 1 will be used to explain the construction of the speaker ID device of the invention. FIG. 1 is a block diagram showing the construction of the speaker ID device of the invention.

In the speaker recognition device 100 of this embodiment, each operator that will be the object of recognition says a password that identifies the operator a plurality of times, and HMM data that is created based on the voice component spoken by that operator is registered in advance, then when performing the process of identifying and recognizing that speaker (hereafter, referred to as the 'recognition process'), the operator, or in other words, the speaker that says the password is identified and recognized based on the registered HMM data and voice component of the password spoken by the operator.

More particularly, when registering HMM data that is used when performing the recognition process, the speaker recognition device 100 of this embodiment eliminates the registration of HMM data of a password having a characteristic amount of the voice component that resembles the characteristic amount indicated by the already registered HMM data, and does not allow the registration of HMM data that could become the cause of errors in recognition when performing the recognition process.

More specifically, when performing the process of registering HMM data (hereafter, referred to as the 'registration process'), the speaker recognition device 100 of this embodiment extracts a characteristic amount from the voice component of the password that the operator desires to register, and calculates the likelihood for both the extracted characteristic amount and all of the registered HMM data, and based on the calculated likelihood values and a preset threshold value, determines whether or not to allow registration of the desired password. Also, when a calculated likelihood value is equal to the preset threshold value or less, the speaker recognition device 100 allows registration of the password desired by the operator and acquires the voice component a plurality of times for the password for which registration is allowed, and then based on a characteristic amount in the voice component of the spoken password that was acquired a plurality of times, HMM data is learned and created, and that created HMM data is registered.

As shown in FIG. 1, this speaker recognition device 100 comprises: a microphone 110 by which the speaker inputs the spoken password; an input processing unit 120 that performs specified processing of the voice signal of the spoken password; a characteristic amount extraction unit 130 that extracts a characteristic amount of the voice component of a spoken voice (hereafter, referred to as the 'spoken voice component') based on the voice signal of the spoken password; a database 140 in which HMM data of a plurality of passwords that are preset by the speaker is registered; and a likelihood calculation unit 150 that calculates the likelihood (described later) of all of the HMM data registered in the database 140 and the characteristic amount of extracted spoken voice component; wherein the likelihood is calculated as will be described later based on the spoken voice component and registered HMM data that were input during the recognition process and registration process.

Also, when performing the registration process, this speaker recognition device 100 comprises: a registration judgment unit 160 that determines whether or not to allow registration of a password set by the speaker as a password for performing recognition of the speaker based on the calculated likelihood; a display unit 170 that displays the judgment result from the registration judgment unit 160; a display control unit 180 that controls the display unit 170; a speaker 190 that notifies of the judgment result from the registration judgment unit 160; an amplification control unit 200 that controls the speaker 190; and a data generation unit 21 that learns and generates HMM data when it is allowed for the speaker to register a password, which was set by the speaker as a password, as HMM data.

Furthermore, this speaker recognition device 100 comprises: a recognition processing unit 220 that performs the recognition process based on a characteristic amount of the extracted password and the HMM data that is registered in the database; an operation control unit 230 that is used for performing various operations; a system control unit 240 that performs overall control of the device, as well as controls each unit when registering HMM data or when executing the recognition process; and ROM/RAM 250 that is used when controlling each part.

For example, the microphone 110 of this embodiment forms the input means of the invention, the input means forms the comparison information generation means of the invention, and the characteristic amount extraction unit 130 forms the comparison information generation means and extraction means. Also, for example, the database 140 of this embodiment forms the database 140 of the invention, and the likelihood calculation unit 150 forms the calculation means of the invention. Furthermore, for example, the display unit 170 and speaker 190 of this embodiment form the notification means of the invention, and the data generation unit 210 forms the update means and second update means of the invention.

When performing the recognition process, or when performing the registration process, the spoken voice of the password that the operator, or in other words, the speaker desires to register is input to the microphone 110, and the microphone 110 converts the spoken voice of the input password to an electrical voice signal, and outputs that signal to the input processing unit 120.

The voice signal that is output from the microphone is input to the input processing unit 120, and the input processing unit 120 amplifies the input voice signal to a specified level, as well as converts the signal to a digital signal.

Also, the input processing unit 120 cuts out the voice signal that indicates the voice section of the spoken voice portion of the input voice signal, as well as divides the voice signal of the cut out voice section into frames for preset time intervals, and outputs the voice signals of each of the frame divisions to the characteristic amount extraction unit 130.

Every time a spoken password is input to the microphone 110, the voice signal that has been divided into frames is input to the characteristic amount extraction unit 130, and under the control of the system control unit 240, the characteristic amount extraction unit 130 analyzes each frame of the input voice signal, as well as extracts a characteristic amount of the spoken voice component based on each frame of the voice signal, and outputs the extracted characteristic amount for each frame as characteristic amount data to the likelihood calculation unit 150, or (as will be described later) when registration of the password is allowed, outputs the extracted characteristic amount for each frame to the data generation unit 210.

More specifically, the characteristic amount extraction unit 130 extracts spectral envelope information, which indicates the power at each frequency at set time intervals of time, or cepstrum information, which is obtained by taking the logarithm of the power spectrum and performing inverse Fourier transformation, as the characteristic amount of the spoken voice component for each frame, as well as vectorizes each extracted characteristic amount and generates characteristic amount data, then outputs the generated characteristic amount data to the likelihood calculation unit 150 or to the data generation unit 210.

When the data generation unit 210 learns and generates HMM data, the characteristic amount extraction unit 130 of this embodiment extracts the characteristic amount of the spoken voice component based on the input voice signal each time a voice signal that has been divided into frames is input, and outputs the result to the data generation unit 210.

The HMM data that was generated based on the spoken voice components by the operators of the passwords for identifying the operators is correlated with the names of the operators and registered beforehand in the database 140.

This HMM data indicates a probability model having spectral envelope data, which indicates the power at each frequency at set intervals of time, or cepstrum data, which is obtained by taking the logarithm of the power spectrum and performing inverse Fourier transformation. More specifically, this HMM has two parameters, one of which is the state transition probability that indicates the probability of the state transitioning from one state to another state, and the other of which is output probability of outputting the probability of the vector (characteristic amount vector for each frame) that is observed when the state transitions, and it indicates a group of transition states for each arbitrary section of spoken voice, and is a statistical signal source model that expresses a non-stationary signal source by the connection with a stationary signal.

Time-series data of the vector characteristic amounts of all of the frames of one spoken password is input to the likelihood calculation unit 150 as characteristic amount data, and under the control of the system control unit 240, the likelihood calculation unit 150 calculates the likelihood based on the input characteristic data arranged in a time series of all of the frames of one spoken password and the HMM data that is stored in the database 140.

More specifically, the likelihood calculation unit 150 outputs vectors each time the HMM changes states from the initial state as time progresses, and when the state reaches the final state, calculates the probability that the input characteristic data that is arranged in a time series of all of the frames of one spoken password will be output. Moreover, this likelihood calculation unit 150 calculates that calculated probability as the likelihood.

On the other hand, this likelihood calculation unit 150 searches for the highest likelihood (hereafter, referred to as the maximum likelihood) of the calculated likelihoods of the HMM of each speaker, and outputs this maximum likelihood to either the registration judgment unit 160 or recognition processing unit 220 as likelihood data.

When the registration process is being performed, this likelihood calculation unit 150 outputs the maximum likelihood as likelihood data to the registration judgment unit 160, and when the recognition process is being performed, the likelihood calculation unit 150 outputs the maximum likelihood data of the calculated likelihoods as likelihood data to the recognition processing unit 220.

When the registration process is being performed, the likelihood data for the password that is output from the likelihood calculation unit 150 and that the operator desires to register is input to the registration judgment unit 160, and based on the input likelihood data, this registration judgment unit 160 determines whether or not to allow registration of the password, which is based on the calculation of the likelihood, in the database 140, and notifies the system control unit 240 of the judgment result.

More specifically, this registration judgment unit 160 compares the likelihood indicated by the input likelihood data with a preset threshold value (hereafter, referred to as the registration judgment threshold value), and when that likelihood is equal to or less than the threshold value, determines that there are no similar passwords registered in the database 140 and allows registration of the password, which is based on the calculation of that likelihood, in the database 140 (hereafter, simply referred to as 'registration allowed judgment').

On the other hand, this registration judgment unit 160 compares the likelihood indicated by the input likelihood data with a preset threshold value, and when that likelihood is greater than the threshold value, determines that there is a similar password registered in the database 140, and does not allow registration of the password, which is based on the calculation of that likelihood, in the database 140 (hereafter, simply referred to as 'registration not allowed judgment').

As will be described later, when the system control unit 240 is notified of the judgment that registration is allowed, the system control unit 240 notifies the operator by way of the display unit 170 and speaker 190 that registration is allowed, and executes the process for generating HMM data for the password that is the object of the allowed registration. Moreover, when notified of the judgment that registration is not allowed, this system control unit 240 notifies the operator by way of the display unit 170 and speaker 190 that registration is not allowed, and prompts the operator to input the password again.

When registration of the password desired by the operation is allowed when performing the registration process, the characteristic amount data of the password that was extracted by the characteristic amount extraction unit 130 before determining whether or not to allow registration of the password, and characteristic amount data of the password that was extracted by the characteristic amount extraction unit 130 each time that password was input when the password is input a plurality of times after registration of the password is allowed, is input to the data generation unit 210. Based on the input characteristic amount data, this data generation unit 210 learns and generates HMM data, and correlates the generated HMM data with the name of the operator and registers the data in a database 140.

More specifically, based on the plurality of input characteristic amount data, the data generation unit 210 of this embodiment learns and generates a probability model having spectral envelope data that indicates the power for each frequency after each fixed time interval, or cepstrum data for which the logarithm of the power spectrum is taken and inverse Fourier transformation is performed, and registers that generated probability model in the database 140 as HMM data.

The display unit 170 comprises a CRT and liquid-crystal display elements or EL (Electro Luminescence) elements, and performs various displays according to control from the display control unit 180, and particularly, the display unit 170 of this embodiment performs various displays such as whether or not registration of the desired password that was input by the operator is allowed.

Under control from the system control unit 240, the display control unit 180 controls the display of the display unit 170, and particularly, the display control unit 180 of this embodiment generates display data for notifying whether or not the desired password that was input by the operator is allowed, and for notifying the operator of changes in the password, and controls the display unit 170 so that it displays that generated data.

The speaker 190 amplifies a specified sound when performing various notifications according to control from the amplification control unit 200, and particularly the speaker 190 of this embodiment is used when notifying whether or not the desired password that was input by the operator is allowed.

Under control from the system control unit 240, the amplification control unit 200 performs amplification control of the speaker 190, and particularly, the amplification control unit 200 of this embodiment generates audio data for notifying whether or not the desired password that was input by the operator is allowed, and for notifying the operator of changes in the password, and controls the speaker 190 so that it outputs the generated audio data.

When performing recognition processing, likelihood data that indicates the maximum likelihood that was calculated by the likelihood calculation unit 150 is input to the recognition processing unit 220, and based on the input maximum likelihood, this recognition processing unit 220 performs recognition of the operator, or in other words, performs recognition of the speaker.

For example, the recognition processing unit 220 of this embodiment determines whether or not the maximum likelihood in the input likelihood data is equal to or greater than a preset recognition processing threshold value (hereafter, referred to as the recognition processing threshold value), and when that maximum likelihood is equal to or greater than the recognition processing threshold value, recognizes the registered operator that corresponds to the HMM data that was used when calculating that likelihood as the operator that spoke the password in the recognition process, or in other words, recognizes the operator as the speaker, and outputs that recognition result to the system control unit 240.

When the maximum likelihood is less than the recognition processing threshold value, the recognition processing unit 220 of this embodiment outputs a notification to the system control unit 240 that the operator who spoke the password in the recognition process does not correspond to any of the operators registered in the database 140. A value that is greater than the registration judgment threshold value is used for this recognition process threshold value.

The operation control unit 230 comprises a keyboard that contains a plurality of keys such as various confirmation buttons, number keys and the like, or an input interface such as a touch panel, and particularly, in this embodiment, when performing the registration process, or when performing the recognition process, is used to perform specified operations.

The system control unit 240 comprises mainly a central processing unit (CPU), and includes various input/output ports such as a key input port, display control port and the like, and performs overall control of the functions for the registration process and recognition process.

When performing the registration process and recognition process, this system control unit 240 reads control programs that are stored in the ROM/RAM 250 and executes processing, and temporarily stores data during processing in the ROM/RAM 250.

The operation of the registration process by the system control unit 240 of this embodiment will be described in detail later.

The ROM/RAM 250 stores control programs that are used when performing specified operations, and temporarily stores data that is used when controlling each of the various units.

Next, the operation of the registration process by the system control unit 240 of this embodiment will be explained using FIG. 2.

Figure 2:
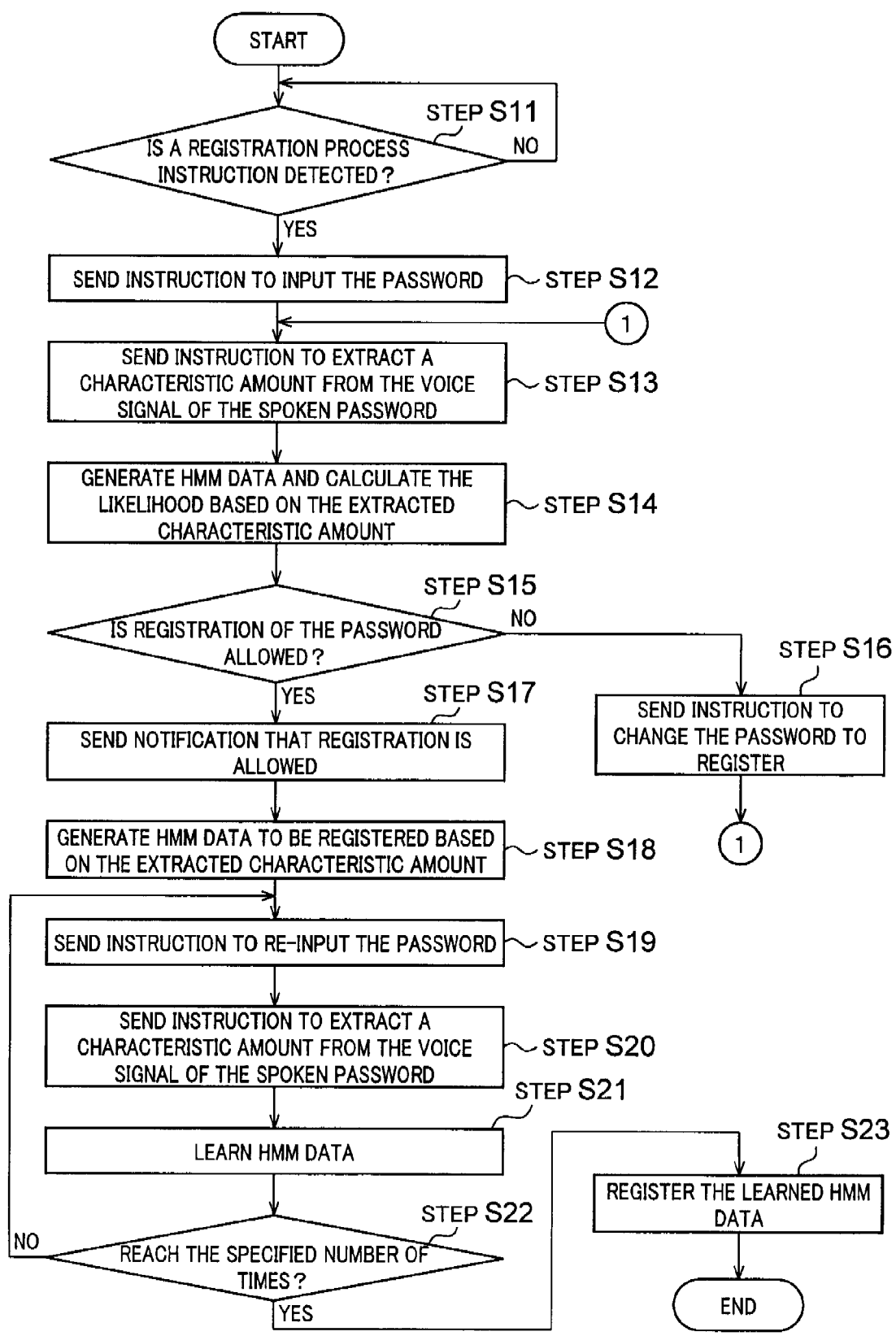
FIG. 2 is a flowchart showing the operation of the registration process of the system control unit of the first embodiment of the invention.

FIG. 2 is a flowchart that shows the operation of the registration process by the system control unit 240 of this embodiment. In the operation described below, HMM data for a plurality of operators is registered in advance in the database 140.

First, an instruction to execute the registration process for registering HMM data of the password is input by the operator by way of the operation control unit 230, and when the system control unit 240 detects that instruction to execute the registration process (step S11), the system control unit 240 controls the display control unit 180 and amplification control unit 200 to send a notification by way of the display unit 170 and speaker 190 to prompt the operator to input the password (hereafter, this will be referred to as the 'input instruction notification') (step S12).

Next, the system control unit 240 sends an instruction to the characteristic amount extraction unit 130 to extract the characteristic amount of the spoken voice component of the password that was input by way of the microphone 110 and input processing unit 120 (step S13).

After the instruction has been given in step S13, the characteristic amount extraction unit 130 extracts the characteristic amount as described above for each frame of the voice component of the password that is spoken into the microphone 110 by the operator and divided into frames by the input processing unit 120, and outputs the time series data of the extracted characteristic amounts for all of the frames of the spoken password to the likelihood calculation unit 150 as characteristic amount data.

Next, the system control unit 240 compares the characteristic amount for each frame that was input to the likelihood calculation unit 150 with each of the HMM data that is stored in the database 140, and calculates the likelihood of both the characteristic amount of the overall spoken voice component of the input password and the characteristic amount of each of the HMM data, then of the calculated likelihoods, outputs the maximum likelihood to the registration judgment unit 160 as likelihood data (step S14).

Next, the system control unit 240 has the registration judgment unit 160 compare the maximum likelihood with the registration judgment threshold value to determine whether or not to allow registration of the input password (step S15), and when the registration judgment unit 160 determines that the maximum likelihood is greater than the registration judgment threshold value, the system control unit 240 controls the display control unit 180 and amplification control unit 200, and has the display unit 170 and speaker 190 send a notification of the password to be registered, or in other words, send a notification prompting the operator to change the password to be registered (hereafter, referred to as the 'change instruction notification') (step S16), and goes to the processing of step S13.

On the other hand, when the registration judgment unit 160 determines that the maximum likelihood is equal to or less than the registration judgment threshold value, the system control unit 240 controls the display control unit 180 and amplification control unit 200 to notify the operator by way of the display unit 170 and speaker 190 that registration is possible (step S17).

Next, the system control unit 240 has the data generation unit 210 obtain the characteristic amount of the input password from the characteristic amount extraction unit 130, and generates HMM data for the password (step S18), then controls the display control unit 180 and amplification unit 200 to send a notification by way of the display unit 170 and speaker 190 prompting the operator to input the password to be registered (hereafter, referred to as the 're-input instruction notification') (step S19).

Next, similar to the processing of step S13, the system control unit 240 instructs the characteristic amount extraction unit 130 to extract the characteristic amount from the spoken voice component of the password input by way of the microphone 110 and input processing unit 120 (step S20)

When that happens, similar to the processing described above, the voice of the operator's password is input through the microphone 110 and the characteristic amount extraction unit 130 extracts the characteristic amount as described above from the voice component of each frame divided by the input processing unit 120, and outputs the time-series data of the extracted characteristic amounts of all the frames of one spoken password to the data generation unit 210 as characteristic amount data.

At that time, when the system control unit 240 determines that the password has not yet been input a preset number of times, the system control unit 240 advances to the processing of step S20, and when the system control unit 240 determines that the password has been input the preset number of times, the system control unit 240 instructs the data generation unit 210 to learn the HMM data.

Next, the system control unit 240 has the HMM data that was generated based on the characteristic amount data that was input to the data generation unit 210 learned (step S21), and has the generated HMM data be correlated with the operator who entered the password and registered in the database 140 (step S23), after which it ends this operation.

The speaker recognition device 100 of the embodiment described above has a database 140 in which HMM data that is learned from the characteristic amount of the spoken voice component of a password, whose registration can be changed, for each operator that is the object of recognition is registered in advance, and is a speaker recognition device 100 that recognizes an operator by comparing the characteristic amount of the spoken voice component of a password of an operator to be identified with that HMM data, and comprises: a microphone 110 that is used for inputting the characteristic amount of the voice component of a password to be registered when registering the HMM data learned from the characteristic amount of the voice component of the password in the database 140; a characteristic amount extraction unit 130 that extracts the characteristic amount from the voice component of the input password; a likelihood calculation unit 150 that compares the extracted characteristic amount with HMM data for comparison that is learned from the characteristic amount of the spoken voice component of the operator's password, and calculates the likelihood for both the extracted characteristic amount and the HMM data for comparison that is learned from the characteristic amount of the spoken voice component of the operator's password; and a data generation unit 210 that uses the HMM data that is generated based on the extracted characteristic amount of the voice component of the spoken password to update the database 140.

With this construction, when registering HMM data based on the spoken password that is desired by the operator, the speaker recognition device 100 of this embodiment calculates the likelihood for both the characteristic amount that is extracted from the spoken voice component of the input password, and all of the HMM data that is registered in the database 140, and when the calculated likelihood is equal to or less than a registration judgment threshold value, which is used as a reference, uses the HMM data that is generated based on the characteristic amount of the spoken voice component of the password that the operator desires to register to update the database 140.

Therefore, the speaker recognition device 100 of this embodiment can delete registration of data such as HMM data that is based on characteristic amounts for which error in recognition could occur easily when recognizing an operator, and thus can reduce the possibility of errors in recognition even more and provide more stable recognition performance.

Also, the speaker recognition device 100 of this embodiment calculates the likelihoods for the characteristic amounts of the voice components of each password for comparison based on the characteristic amount for the voice component of a password that is input for the first time, and when the calculated likelihoods that are based on the characteristic amount of the voice component of the password that is input for the first time is equal to or less than a registration judgment threshold value, the data generation unit 210 generates HMM data based on all of the extracted characteristic amounts of the spoken passwords, and then using that generated HMM data, updates the database 140.

With this construction, judgment to determine whether or not registration is allowed is only performed for the first time a password is spoken, when the password to be registered must be spoken a plurality of times, so even though a password is re-input, it is possible to reduce the load on the operator.

In this embodiment, after registration of a password is allowed, the data generation unit 210 learns HMM data based on the characteristic amount of the spoken voice component of the password that is input a plurality of times, however, it is possible to perform judgment to determine whether or not to allow registration an arbitrary plurality of times for a password that is spoken a plurality of times. In that case, characteristic amount data for the spoken password that is input a plurality of times and that is not used by the registration judgment in the likelihood calculation is stored temporarily in ROM/RAM 250.

Moreover, in this embodiment, when the registration judgment unit 160 determines that registration is not allowed, the password that the operator desires to register must be input again, and until registration is allowed by the registration judgment unit 160, instruction is given to input the password to be registered again, however, it is possible to set a limit on the number of times that the password can be input.

In this case, the system control unit 240 stores the calculated maximum likelihood in the ROM/RAM 250 each time a password change instruction is performed, and when registration of the desired password is not allowed even after re-entering the password the preset number of times, the system control unit 240 selects from among the maximum likelihoods stored in the ROM/RAM 250, which functions as the memory means of this invention, the password having the minimum maximum likelihood, and based on the characteristic amount of the input spoken voice, has the data generation unit 210 learn and generate HMM data for the selected password, and then register the generated HMM data in the database 140. Also, in that case, as described above, each time the password to be registered is input, the system control unit 240 instructs the operator by way of the display unit 170 and speaker 190 to input the spoken voice a plurality of times. Therefore, in this way, by limiting the number of times the password can be input, it is possible to reduce the burden on the operator performing the registration process. Also, in this case, as described above, the recognition process threshold value is changed based on the calculated likelihood, or in other words, based on the likelihood having a value greater than the registration judgment threshold value when performing registration judgment of the password that is the object of registration. For example, in this case, the system control unit 240 calculates a specified recognition processing threshold value that is larger than the maximum likelihood, and stores that value in the recognition processing unit 220.

Also, instead of restricting input of the spoken password as described above, the calculated maximum likelihood can be stored in ROM/RAM 250, and when the maximum likelihood for the currently input password is greater than the maximum likelihood of the previously input password, HMM data can be learned and generated based on the spoken voice of the previously input password. By restricting re-input of the password based on a specified standard in this way, it is possible to reduce the burden on the operator during the registration process similar to as described above. Also, in this case, similar to as was described above, the recognition processing threshold value is changed based on the likelihood that is calculated when performing registration judgment of the password that is the object of registration, or in other words, based on the maximum likelihood having a value that is larger than the registration judgment threshold value. For example, in this case, the system control unit 240 calculates a recognition processing threshold value that is a specified amount larger than the maximum likelihood, and stores that value in the recognition processing unit 220.

An example was given here in which HMM data was used as biological information for comparison, and the signal generation probability was used as the likelihood, however, various other methods could be used, such as a method of using a GMM (Gaussian Mixture Model) as biological information for comparison, and using the signal generation probability as the likelihood, and in the case of using dynamic programming, a method of using a comparison pattern as biological information for comparison, and using the inverse of the distance between patterns as the likelihood, or in the case of using a neural network, a method of using a neural network as biological information for comparison, and using network output as the likelihood.

Moreover, in recent years, research and development has been performed in the area of distributed type voice recognition that applies data communication such as communication over a mobile phone or the Internet. Here, the terminal side waits for computation by a microphone and CPU, then converts a spoken voice to a characteristic amount and sends it to a server by data communication. The server finds the result from performing voice recognition processing on the received characteristic amount, and performs a data search using the found result. Also, the server sends the found result and data search result to the terminal by using data communication again, and the terminal notifies the user by using sound or images. This kind of construction can also be used with the present invention. In this case, construction can be such that the terminal takes control of the input processing unit, characteristic amount extraction unit, display unit and speaker, and the server takes control of the data generation unit, database, likelihood calculation unit, registration judgment unit and recognition processing unit.

Also, in this embodiment, the system control unit 240 performs the registration process, however, it is also possible for a speaker recognition device 100 having a database in which a plurality of HMM data are registered for the operators to comprise a computer and recording medium, and to store control programs on the recording medium to execute the registration process described above, and by reading the program that performs the registration process by a computer, the same registration process as described above can be performed.

Embodiment 2

Next, a second embodiment of an operator recognition device of the present invention will be explained using FIG. 3 and FIG. 4, and using an example of a fingerprint recognition device.

The fingerprint recognition device of this invention differs from the speaker recognition device of the first embodiment in that instead of performing the recognition process by using a characteristic amount of the voice of a spoken password, a characteristic amount of the fingerprint of an operator is used.

In other words, the number of fingerprints of each operator is the just the number of fingers of the operator, so fingerprints are one kind of biological data for each operator that can be changed. Also, the fingerprint is obtained as an image of the fingerprint (hereafter, referred to as a 'fingerprint image'), and by analyzing the characteristics such as the positions of branches and ends of fingerprint ridges based on that fingerprint image, a characteristic amount of the fingerprint image can be extracted. Therefore, the fingerprint recognition device of this embodiment can extract a characteristic amount by obtaining a fingerprint image, and analyzing that obtained fingerprint image; and by registering that characteristic amount in a database 140 beforehand, the fingerprint recognition device can calculate the likelihood and perform recognition processing as in the first embodiment.

In this embodiment, except for the construction described above, construction is the same as in the case of the first embodiment, so the same reference numbers will be given to identical parts, and an explanation of them will be omitted.

First, the construction of the fingerprint recognition device 300 of this embodiment will be explained using FIG. 3. FIG. 3 is a block diagram showing the construction of the fingerprint recognition device 300 of this embodiment.

Figure 3:
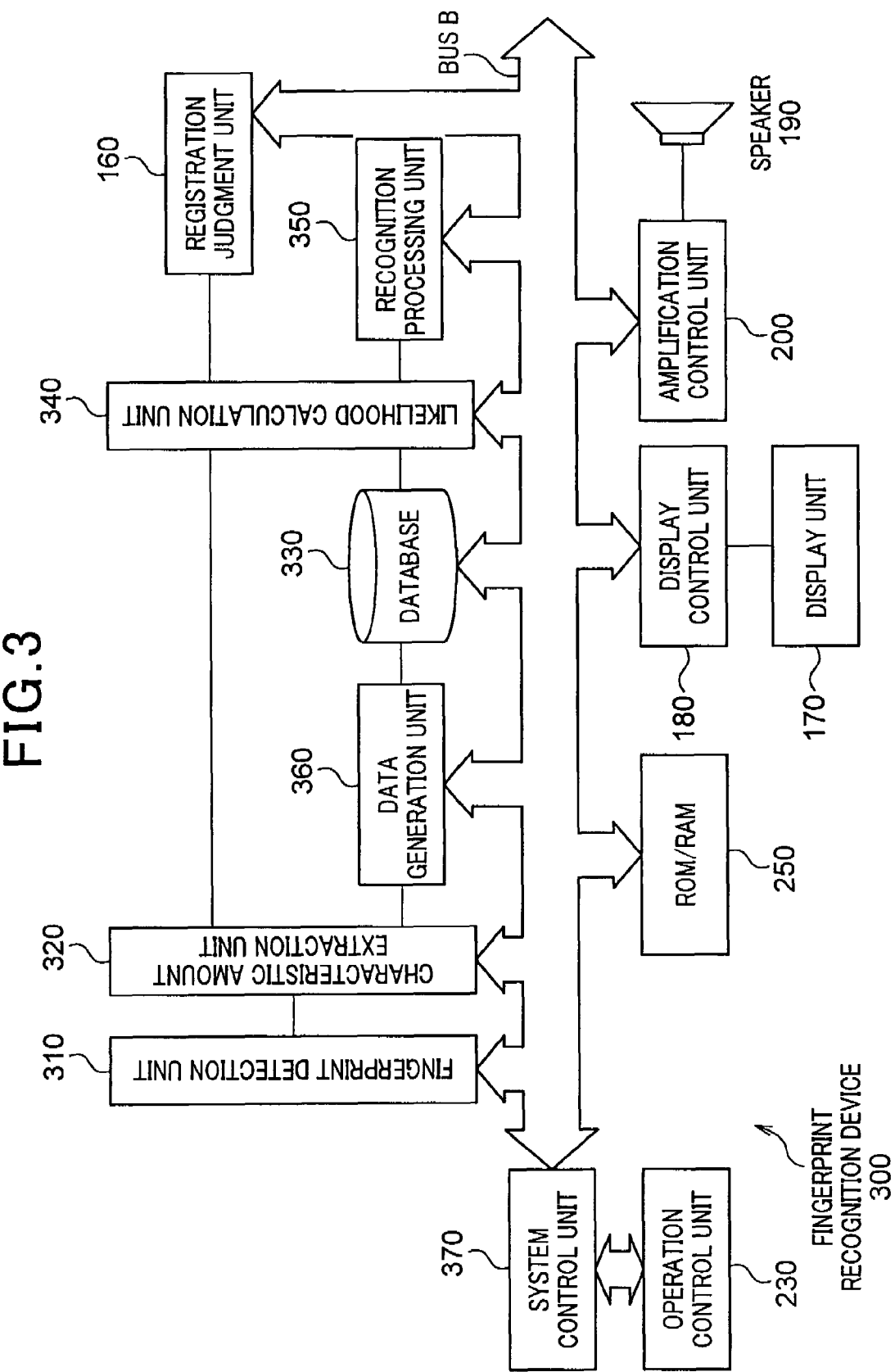
FIG. 3 is a block diagram showing the construction of a fingerprint recognition device of a second embodiment of the operator recognition device of the present invention.

As shown in FIG. 3, the fingerprint recognition device 300 of this embodiment comprises: a fingerprint detection unit 310 that detects the fingerprint of the operator as an image; a characteristic amount extraction unit 320 that extracts a characteristic amount of the fingerprint based on the input fingerprint image; a database 330 in which a plurality of fingerprint data indicating characteristic amounts of operator fingerprints is registered in advance; a likelihood calculation unit 340 that calculates the likelihood of all of the fingerprint data registered in the database 330 and the likelihood of the extracted characteristic amount of the fingerprint image; a recognition processing unit 350 that performs a recognition process based on the extracted characteristic amount of the fingerprint image and fingerprint data that is already registered in the database 330; and a data generation unit 36 that generates fingerprint data.

Also, as in the first embodiment, this fingerprint recognition unit comprises: a registration judgment unit 160, display unit 170, operation control unit 230, system control unit 370 and ROM/RAM 250.

For example, the fingerprint detection unit 310 of this embodiment forms the input means of the invention, and the characteristic amount extraction unit 320 forms the comparison information generation means and extraction means of the invention. Also, for example, the database 330 of this embodiment forms the database of the invention, and the likelihood calculation unit 340 forms the calculation means of the invention. Moreover, the display unit 170 and the speaker 190 of this embodiment form the notification means of the invention, and the data generation unit 360 forms the registration means and second registration means of the invention.

The fingerprint detection unit 310 has a contact section that comes in contact with the finger of the operator, and when a finger comes in contact with the contact section during the registration process or recognition process, the fingerprint detection unit 310 uses an optical or an electrostatic capacitance type fingerprint sensor to take an image of the fingerprint of the finger as the fingerprint image, and outputs the fingerprint image to the characteristic amount extraction unit 320 as fingerprint image data.

The input fingerprint image data of the operator's finger is input to the characteristic amount extraction unit 320, and based on the input fingerprint image data, this characteristic extraction unit 320 extracts a characteristic amount such as the position of branches and ending points of the fingerprint ridges, as described above. Also, this characteristic amount extraction unit 320 outputs the extracted characteristic amount as characteristic amount data to the likelihood calculation unit 340 or data generation unit 360.

Fingerprint data that is generated based on the fingerprint images of the operators are correlated with the names of the operators and registered in advance in the database 330 as the passwords for identifying the operators.

Characteristic amount data that is extracted by the characteristic amount extraction unit 320 is input to the likelihood calculation unit 340, and under control of the system control unit 370, this likelihood calculation unit 340 compares the characteristic amounts of the characteristic amount data with the characteristic amounts that are indicated by the fingerprint data stored in the database 330, and calculates the likelihood for the input characteristic amount and the characteristic amounts for all of the fingerprint data, then outputs the maximum likelihood from among the calculated likelihoods to either the recognition processing unit 350 or registration judgment unit 160 as likelihood data.

As in the first embodiment, when performing the recognition process, the likelihood calculation unit 340 outputs the maximum likelihood from among the calculated likelihood to the recognition processing unit 350 as likelihood data, and when performing the registration process, outputs that maximum likelihood to the registration judgment unit 160 as likelihood data.

When performing the recognition process, likelihood data that indicates the maximum likelihood that was calculated by the likelihood calculation unit 340 is input to the recognition processing unit 350, and based on the input maximum likelihood, this recognition processing unit 350 performs recognition of the operator, or in other words the speaker.

In the registration process, when the fingerprint is allowed to be registered as the password desired by the operator, the data generation unit 210 acquires the characteristic amount data of the fingerprint image that was extracted by the characteristic amount extraction unit 320, and based on that extracted characteristic amount data, generates fingerprint data, then correlates the generated fingerprint data with the operator name and registers the data in the database 330.

Next, the operation of the registration process by the system control unit 370 of this embodiment will be explained using FIG. 4.

Figure 4:
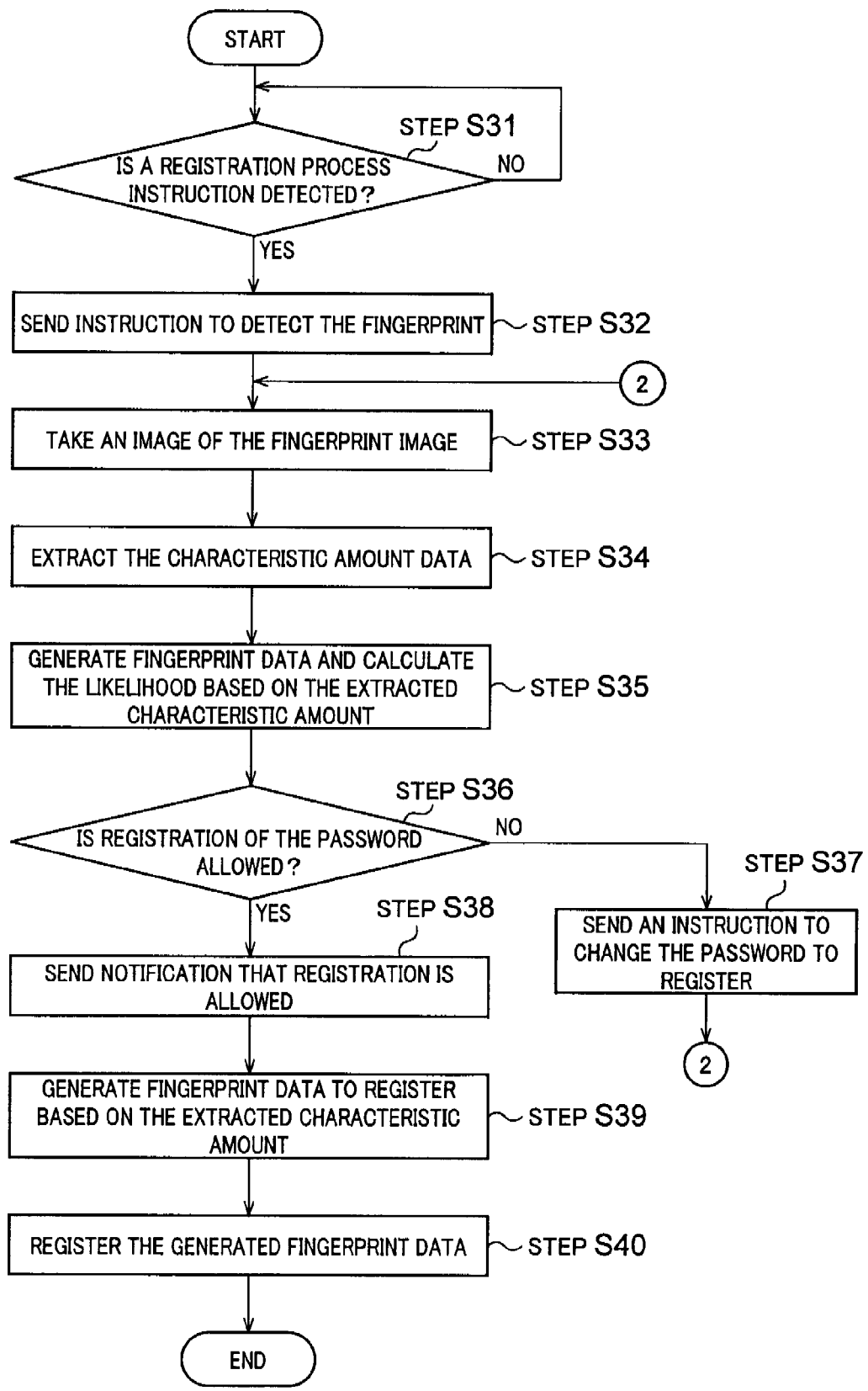
FIG. 4 is a flowchart showing the operation of the registration process of the system control unit of the second embodiment of the invention.

FIG. 4 is a flowchart showing the operation of the registration process by the system control unit 370 of this embodiment of the invention. In the operation described below, fingerprint data for a plurality of operators is registered in advance in the database 330.

First, the operator inputs an instruction by way of the operation control unit 230 to execute the registration process of registering fingerprint data as a password, and when the system control unit 370 detects the instruction to execute the registration process (step S31), the system control unit 370 controls the display control unit 180 and amplification control unit 200 to prompt the operator by way of the display unit 170 or speaker 190 to input the password, or in other words, to perform notification for prompting detection of the fingerprint (hereafter, referred to as the 'detection instruction notification') (step S32).

Next, the system control unit 370 has the fingerprint detection unit 310 take an image of the fingerprint of the finger that is in contact with the contact section (step S33).

The system control unit 370 then has the control amount extraction unit 320 extract a characteristic amount based on the fingerprint image data that was taken, and output that extracted characteristic amount to the likelihood calculation unit 340 as characteristic amount data (step S34).

Next, the system control unit 370 has the likelihood calculation unit compare the input characteristic amount data with each of the characteristic amounts for all of the fingerprint data stored in the database 330, calculate the likelihood for the characteristic amount of the input fingerprint image data and the characteristic amounts of all of the fingerprint data, and output the maximum likelihood of the calculated likelihoods as likelihood data to the registration judgment unit 160 (step S35).

The system control unit 370 then has the registration judgment unit 160 compare the maximum likelihood with the registration judgment threshold value, and determine whether or not to allow registration of the input fingerprint (step S36), and when the registration judgment unit 160 determines that the maximum likelihood is greater than the registration judgment threshold value, the system control unit 370 controls the display control unit 180 and amplification control unit 200 so that they notify the operator by way of the display unit 170 and speaker 190 to change the fingerprint to register (step S37), then moves to the process of step S33.

On the other hand, when the registration judgment unit 160 determines that the maximum likelihood is equal to or less than the registration judgment threshold value, the system control unit 370 controls the display control unit 180 and amplification control unit 200 so that they notify the operator by way of the display unit 170 and speaker 190 that registration is allowed (step S38).

Next, the system control unit 370 has the data generation unit 360 acquire the characteristic amount of the fingerprint image data that was taken from the characteristic amount extraction unit 320 and generate fingerprint data (step S39), and then correlate that generated fingerprint data with the operator and register that data in the database 330 (step S40), after which the system control unit 370 ends this operation.

The fingerprint recognition device 300 of the embodiment described above has a database 330 in which characteristic amounts of fingerprints whose registration can be changed are registered as fingerprint data for each operator that is the object of recognition, and is a fingerprint recognition device 300 that recognizes an operator by comparing the characteristic amount of the fingerprint of the operator to be identified with the registered fingerprint data, and comprises: a fingerprint detection unit 310 that detects the fingerprint to be registered as image data when registering a characteristic amount of the fingerprint of a finger of the operator; a characteristic amount extraction unit 320 that extracts the characteristic amount from the detected fingerprint image data; a likelihood calculation unit 340 that compares the characteristic amount of the extracted fingerprint image data with the characteristic amount of all of the fingerprint data for comparison, and calculates the likelihood that indicates the ratio of how similar the characteristics of the extraction characteristic amount and the characteristic amounts of all of the fingerprint data for comparison are; and a data generation unit that, when the calculated likelihoods are equal to or less than the registration judgment threshold value, which is a reference, uses the fingerprint data that was generated based on the characteristic amount of the extracted fingerprint image data to update the database 330.

With this construction, when registering fingerprint data based on the fingerprint desired by the operator, the fingerprint recognition device 300 of this embodiment calculates the likelihood that indicates the ratio of how much the characteristics of a characteristic amount that is extracted from detected fingerprint data resembles the characteristic amount of all of the fingerprint data that is registered in the database 330, and when the calculated likelihood is equal to or less than the reference registration judgment threshold value, uses fingerprint data that is generated based on the characteristic amount of the fingerprint desired by the operator and updates the database 330.

Therefore, as in the case of the first embodiment, the fingerprint recognition device 300 of this embodiment deletes registration of data such as fingerprint data having a characteristic amount for which an error in recognition could easily occur when recognizing an operator, thus reducing the possibility of error in recognition and making it possible to provide more stable recognition performance.

Also, when at least one of the calculated likelihoods is greater than the registration judgment threshold value, the fingerprint recognition device 300 of this embodiment is constructed so that it further comprises a display unit 170 and speaker 190 that notify the operator to re-input the characteristic amount of fingerprint image data having a characteristic amount that is different than the characteristic amount of the detected fingerprint image data.

With this kind of construction, when at least one of the calculated likelihoods is greater than the registration judgment threshold value, the fingerprint recognition device 300 of this embodiment notifies the operator to re-input fingerprint image data having a characteristic amount that is different than that characteristic amount of the detected fingerprint image data.

Therefore, as in the case of the first embodiment, the fingerprint recognition device 300 of this embodiment can notify the operator to re-input fingerprint image data to be registered as the operator password, so that a password can always be registered.

Also, in this embodiment, when the registration judgment unit 160 determines that registration is not allowed, fingerprint image data that the operator desired to register as a password is detected again, and an instruction is given to redetect the fingerprint image data to be registered until the registration judgment unit 160 allows registration, however, it is also possible to set a limit on the number of times the fingerprint image data can be redetected.

In this case, the system control unit 370 stores the maximum likelihood that was created in ROM/RAM 250 each time a fingerprint change instruction is performed, and when registration of the desired fingerprint is not allowed even though the fingerprint has been re-input a preset number of times, the system control unit 370 selects fingerprint image data having the minimum maximum likelihood from among the maximum likelihoods stored in the ROM/RAM 250 that functions as the memory means of the invention, and has the data generation unit 360 generate fingerprint data based on the fingerprint image data that was selected, and then update the database 330 using that generated fingerprint data.

Also, in this embodiment, the registration process is performed by the system control unit 370, however, it is also possible for the fingerprint recognition device 300 having a database 330 in which a plurality of fingerprint data is registered for each operator to comprise a computer and recording medium, and to store a control program that executes the registration process described above on the recording medium, and by having the computer read the program that executes the registration process, the computer can perform the same registration process as described above Embodiment 3

Next, a third embodiment of the operator recognition devices of this invention will be explained using FIG. 5 and FIG. 6 and using an example of a speaker recognition device.

When the speaker recognition device of the first embodiment performs the process of registering HMM data, it extracts the characteristic amount of the spoken voice component of the password that the operator desires to register and calculates the likelihood of the extracted characteristic amount and the likelihood of all of the HMM data that is already registered, and based on the calculated likelihoods and a preset threshold value, determines whether or not to allow registration of the desired password, however, when the speaker recognition device of this embodiment performs the process of registering HMM data, it extracts the characteristic amount from the spoken voice component of the password that the operator desires to register and calculates the likelihood of the HMM data that is generated from the extracted characteristic amount and the likelihood of all the HMM data that is already registered, and based on the calculated likelihoods and a preset threshold value, determines whether or not to allow registration of the desired password.

Figure 5:
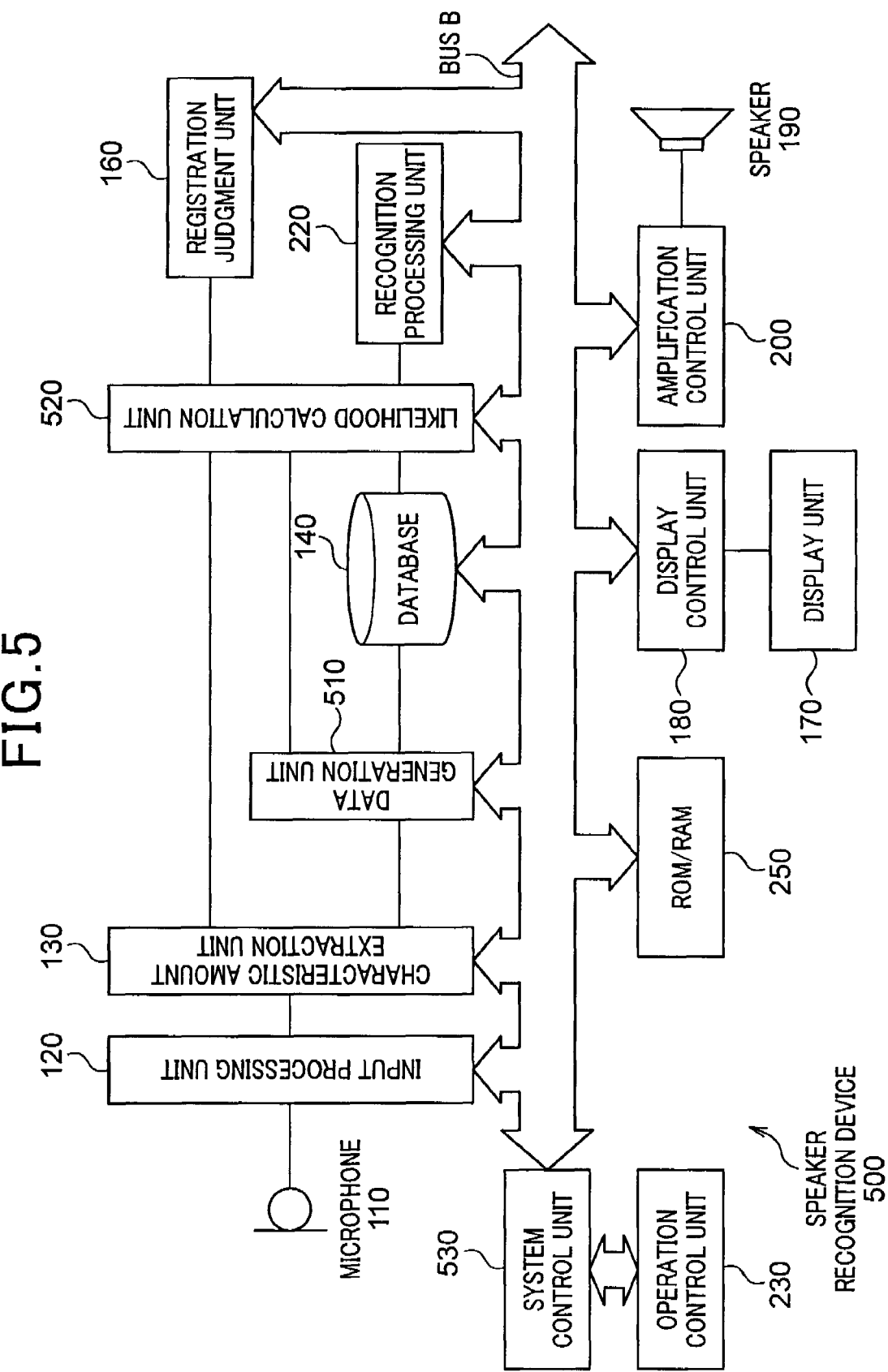
FIG. 5 is a block diagram showing the construction of a speaker recognition device of a third embodiment of the operator recognition device of the present invention.

First, FIG. 5 will be used to explain the construction of the speaker recognition device 500 of this embodiment. FIG. 5 is a block diagram showing the construction of the speaker recognition device 500 of this embodiment.

Except for the construction described above, the speaker recognition device of this embodiment has the same construction as the speaker recognition device of the first embodiment, so the same reference numbers will be used for parts and operations that are the same, and an explanation of them will be omitted.

When performing the registration process, the speaker recognition device 500 of this embodiment particularly acquires the spoken voice of the password to be registered by the operator a plurality of times, and calculates the likelihood for both HMM data that is learned and generated based on the acquired characteristic amount of the spoken voice of the password that was spoken a plurality of times, and all the HMM data that is already registered, and based on the calculated likelihoods and a preset threshold value determines whether or not to allow registration of the desired password to be registered. Also, when the calculated likelihoods are equal to or less than the preset threshold value, this speaker recognition device 500 allows registration of the password that the operator desires to register, and after registration is allowed, performs registration of the generated HMM data.

As shown in FIG. 5, this speaker recognition device 500 comprises: a data generation unit that learns and generates HMM data from the characteristic amount of the spoken voice component of the spoken password that was extracted by the characteristic amount extraction unit 130, and a likelihood calculation unit 520 that calculates the likelihood of HMM data that was learned and generated by the data generation unit 510 and the likelihood of all the HMM data registered in the database 140.

Also, as in the case of the first embodiment, this speaker recognition device 500 comprises: a microphone 110, input processing unit 120, characteristic amount extraction unit 130, database 140, registration judgment unit 160, display unit 170, display control unit 180, speaker 190, amplification control unit 200, recognition processing unit 220, operation control unit 230, system control unit 530, and ROM/RAM 250.

For example, the likelihood calculation unit 520 forms the calculation means of the invention. Also, the display unit 170 and speaker 190 of this embodiment form the notification means of the invention, and the data generation unit 510 forms the comparison information generation means, update means and second update means of the invention.

When performing the registration process, the characteristic amount data for the password that was extracted by the characteristic amount extraction unit 130 is input to the data generation unit 510, and based on the input characteristic data, the data generation unit 510 learns and generates HMM data, then outputs that generated HMM data to the likelihood calculation unit 520.

When performing the registration process, the likelihood calculation unit 520 calculates the likelihoods based on the HMM data that was input from the data generation unit 510 and all the HMM data stored in the database 140, then searches for the likelihoods that were calculated for the HMM of each speaker for the maximum likelihood, and outputs this maximum likelihood to the registration judgment unit 160 as likelihood data.

The inverse of the distance between HMM data, for example, can be used as the likelihood between HMM data. A scale according to the Kullback information amount can be used as the scale for comparing the distance between HMM data (hereafter, referred to as the 'distance scale') (refer to Shingaku Gihou SPSP94-16 Y. Okato, S. Hayamizu and S. Itahashi, "Investigation of distance measured between HMMs by clustering," IEICE Technical Report, SP94-16, pp. 15-20, June 1994). This will be explained with the aforementioned document as a reference.

For example, taking the HMM data that is generated by the data generation unit 510 during the registration process to be $\lambda_0$, and the characteristic amount sequence of the spoken voice that is used when calculating $\lambda_0$ to be $X_T$, and the HMM data that are registered in the database to be $\lambda$, it is possible to calculate the distance D between $\lambda_0$ and $\lambda$ for each spoken voice using Equation (1) and Equation (2) below. Furthermore, by calculating the average of the calculated distance D for each spoken voice, it is possible to find the value of the distance between the HMM data based on the spoken password desired by the operator and each of the HMM data registered in the database 140.

[Equation 1]
$$D(\lambda_0, \lambda) = H(X_T, \lambda_0) - H(X_T, \lambda) \quad (1)$$

[Equation 2]
$$H(X_T, \lambda) = \lim_{T \to \infty} \frac{1}{T} \log P(X_T | \lambda) \quad (2)$$

Also, when the HMM data compared are both in the same state, it is possible to similarly use the distance scale calculated from Equation (5), Equation (6) and Equation (7). In this case, as time passes, the distance value between distributions for each transitioning state is calculated, and by averaging the distance values for all states, it is possible to find the distance value between HMM data. When doing this, the average and variance of the Nth dimension Gaussian distribution of the ith state is given by Equation (3) and Equation (4) below, and the ith state of the HMM data that is generated by the data generation unit 510 during the registration process is taken to be m1$i$, and the ith state of the HMM data that are registered in the database 140 is taken to be m21.

[Equation 3]
$$m_i = \begin{pmatrix} pm_{i1} \\ m_{i2} \\ \vdots \\ m_{ij} \\ \vdots \\ m_{iN} \end{pmatrix} \quad (3)$$

[Equation 4]
$$\sigma_i = \begin{pmatrix} \sigma_{i1} \\ \sigma_{i2} \\ \vdots \\ \sigma_{ij} \\ \vdots \\ \sigma_{iN} \end{pmatrix} \quad (4)$$

[Equation 5]
$$d1 \equiv \sum_{state\,i} \|m_{1i} - m_{2i}\|^2 = \sum_i \sum_j |m_{1ij} - m_{2ij}|^2 \quad (5)$$

[Equation 6]
$$d2 \equiv \sum_i \sum_j \frac{|m_{1ij} - m_{2ij}|^2}{\sigma_{1ij}\sigma_{2ij}} \quad (6)$$

[Equation 7]
$$d3 = \frac{1}{2} \sum_i \sum_j \left( \frac{\sigma_{2j}^2 + \Delta_{12j}^2}{\sigma_{1j}^2} + \frac{\sigma_{1j}^2 + \Delta_{12j}^2}{\sigma_{2j}^2} - 2 \right) \quad (7)$$

Furthermore, when calculating the distance value in a mixed distribution using Equation (5), Equation (6) and Equation (7) above, by selecting the state of the distribution having the largest mixed ratio of all the states as the representative distribution, it is possible to calculate the distance value from Equation (5), Equation (6) and Equation (7) in the same way as a single distribution. For example, M is taken to be the mixing number, i is taken to be the state of one of the HMM data 1 to be compared, the average of the distribution of the mixture k is given by Equation (8) below, the variance of the distribution of mixture k is given by Equation (9), and the mixing ratio is given by Equation (10). Also, i is taken to be the state of the other HMM data 2 to be compared, the average distribution of the mixture k is given by Equation (11), the variance of the distribution of the mixture k is given by Equation (12), and the mixing ratio is given by Equation (13). In this case, the distance value can be calculated from Equation (16), Equation (17) and Equation (18).

[Equation 8]
$$m_{1i}^k = \{m_{1i1}^k, m_{1i2}^k, \ldots, m_{1in}^k\}^t \quad (8)$$

[Equation 9]
$$\sigma_{1i}^k = \{\sigma_{1i1}^k, \sigma_{1i2}^k, \ldots, \sigma_{1in}^k\}^t \quad (9)$$

[Equation 10]
$$\alpha_{1i}^k \quad (10)$$

[Equation 11]
$$m_{2i}^k = \{m_{2i1}^k, m_{2i2}^k, \ldots, m_{2in}^k\}^t \quad (11)$$

[Equation 12]
$$\sigma_{2i}^k = \{\sigma_{2i1}^k, \sigma_{2i2}^k, \ldots, \sigma_{2in}^k\}^t \quad (12)$$

[Equation 13]
$$\alpha_{2i}^k \quad (13)$$

[Equation 14]
$$k_{1i} = \operatorname{argmax}_{k=1\,to\,M} \alpha_{1i}^k \quad (14)$$

[Equation 15]
$$k_{2i} = \operatorname{argmax}_{k=1\,to\,M} \alpha_{2i}^k \quad (15)$$

[Equation 16]
$$d1 = \sum_i \sum_j |m_{1ij}^{k1i} - m_{2ij}^{k2i}|^2 \quad (16)$$

[Equation 17]
$$d2 = \sum_i \sum_j \frac{|m_{1ij}^{k1i} - m_{2ij}^{k2i}|^2}{\sigma_{1ij}^{k1i} \cdot \sigma_{2ij}^{k2i}} \quad (17)$$

[Equation 18]
$$d3 = \frac{1}{2} \sum_i \sum_j \left[ \frac{(\sigma_{2ij}^{k2i})^2 + (m_{1ij}^{k1i} - m_{2ij}^{k2i})^2}{(\sigma_{1ij}^{k1i})^2} + \frac{(\sigma_{1ij}^{k1i})^2 + (m_{1ij}^{k1i} - m_{2ij}^{k2i})^2}{(\sigma_{2ij}^{k2i})^2} - 2 \right] \quad (18)$$

When using DP matching as the method for the recognition process, one of two reference patterns for comparison is used as a template, and by performing matching with the other pattern as a comparison parameter, it is possible to calculate the distance between reference patterns that corresponds to the distance between HMM data when HMM is used. It is also possible to apply other various methods for calculating the likelihood between HMM data.

On the other hand, when performing the registration processing, this likelihood calculation unit 520 calculates the likelihood for both the HMM data that is generated by the data generation unit 510 during the registration process as described above, and all the HMM data that is registered in the database 140, then outputs the maximum likelihood to the registration judgment unit 160 as likelihood data, and when performing the recognition process, as was shown for the first embodiment, outputs the maximum likelihood of the likelihoods that were calculated based on the characteristic amounts arranged in a time series of all of the frames of the spoken password that was input, and the HMM data that is stored in the database 140 to the recognition processing unit 220 as likelihood data.

When there is a notification from the registration judgment unit 160 that registration is allowed, the system control unit 530 notifies the operator by way of the display unit 170 and speaker 190 that registration is allowed, and has the HMM data of the password for which registration is allowed registered in the database 140. Also, when there is a notification from the registration judgment unit 160 that registration is not allowed, the system control unit 530 notifies the operator by way of the display unit 170 and speaker 190 that registration is not allowed, and prompts the operator to re-input the password.

Figure 6:
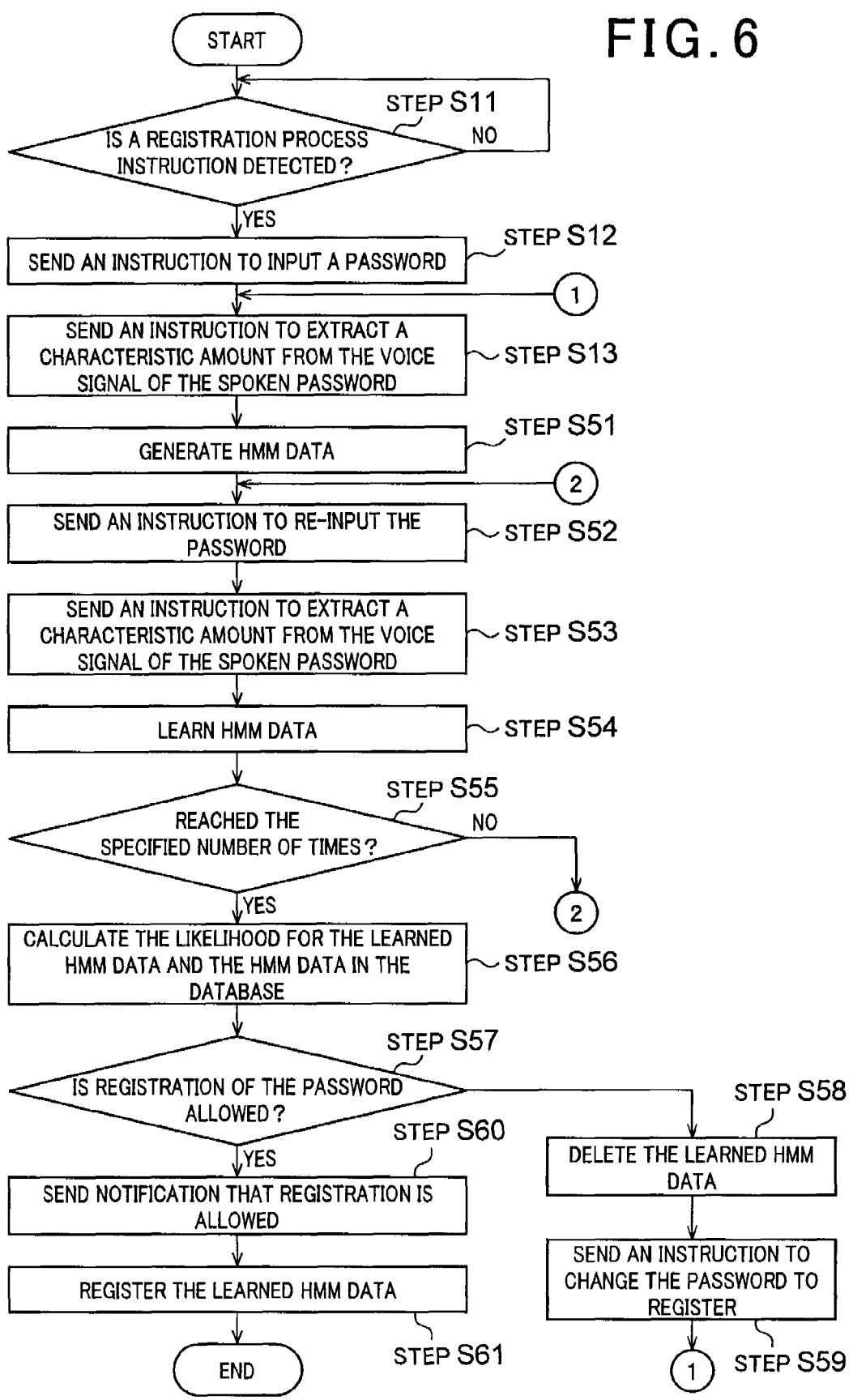
FIG. 6 is a flowchart showing the operation of the registration process of the system control unit of the third embodiment of the invention.

Next, FIG. 6 will be used to explain the operation of the registration process performed by the system control unit 530 of this embodiment.

FIG. 6 is a flowchart showing the operation of the registration process by the system control unit 530 of this embodiment. In this operation described below, HMM data of a plurality of operators is registered in advance in the database 140.

First, the operator, by way of the operation control unit 230, inputs an instruction to execute the registration process to register HMM data of a password, and when the system control unit 530 detects the instruction to execute the registration process (step S11), the system control unit 530 controls the display control unit 180 and amplification control unit 200 to notify the operator by way of the display unit 170 and speaker 190 to input the password (step S12).

Next, the system control unit 530 sends an instruction to the characteristic amount extraction unit 130 to extract a characteristic amount from the spoken voice component of the password that is input by way of the microphone 110 and input processing unit 120 (step S13).

After receiving that instruction in step S13, the characteristic amount extraction unit 130 extracts the characteristic amount from the voice component for each frame of the voice of the operator password that is input by way of the microphone 110 and separated out by the input processing unit 120, and outputs a time series of the characteristic amount for all frames of the extracted spoken password to the data generation unit 510 as characteristic amount data.

Next, the system control unit 530 has the data generation unit 510 acquire characteristic amount data for the password that was input from the characteristic amount extraction unit 130 and generate HMM data for that password (step S51).

The system control unit 530 then controls the display control unit 180 and amplification control unit 200 to notify the operator by way of the display unit 170 and speaker 190 to re-input the password (step S52).

Next, as in the process of step S13, the system control unit 530 instructs the characteristic amount extraction unit 130 to extract a characteristic amount from the spoken voice component of the password that was input by way of the microphone 110 and input processing unit 120 (step S53). After receiving the instruction in step S53, the characteristic amount extraction unit 130 extracts the characteristic amount from the voice component for each frame of the voice of the operator password that was input by way of the microphone 110 and separated out by the input processing unit 120, and outputs a time series of the characteristic amount for all frames of the extracted spoken password to the data generation unit 510 as characteristic amount data.

Next, the system control unit 530 instructs the data generation unit 510 to acquire characteristic amount data for the password that was input from the characteristic amount extraction unit 130, and learn the HMM data (step S54).

The system control unit 530 then determines whether or not the password has been input a preset number of times (step S55). Here, when the system control unit 530 determines that the password has not be input a preset number of times, the system control unit 530 moves on to the processing of step S52 and repeats the process from step S52 to step S54 until the password has been input the preset number of times.

On the other hand, the system control unit 530 has the data generation unit 510 output the learned HMM data to the likelihood calculation unit 520, then has the likelihood calculation unit calculate the likelihoods for the HMM data that was input to the likelihood calculation unit 520 and the HMM data that is stored in the database 140, and output the maximum likelihood from among the calculated likelihoods to the registration judgment unit 160 as likelihood data (step S56).

The system control unit 530 then has the registration judgment unit 160 compare the maximum likelihood with a registration judgment threshold value, and determine whether or not to allow registration of the input password (step S57). Here, when the registration judgment unit 160 determines that the maximum likelihood is greater than the registration judgment threshold value, the system control unit 530 has the HMM data that was learned and generated by the data generation unit 510 deleted (step S58), and controls the display control unit 180 and amplification control unit 200 to notify the operator by way of the display unit 170 and speaker 190 to change the password to be registered (step S59), and moves to the processing of step S13.

However, when the registration judgment unit 160 determines that the maximum likelihood is equal to or less than the registration judgment threshold value, the system control unit 530 controls the display control unit 180 and amplification control unit 200 to notify the operator by way of the display unit 170 and speaker 190 that registration is allowed (step S60).

Next, the system control unit 530 has the HMM data of the password that was learned and generated by the data generation unit 510 correlated with the operator that input the password and then registered in the database 140 (step S61), then ends this operation.

The speaker recognition device 500 of this embodiment is a speaker recognition device 500 that has a database 140 in which HMM data that is learned from a characteristic amount of the spoken voice component of a password of which registration can be changed for each operator that is the target of recognition is registered in advance, and that recognizes an operator by comparing the characteristic amount of the spoken voice component of the password of the operator to be identified with the HMM data, and comprises: a microphone 110 that is used for inputting the characteristic amount of the voice component of a password to be registered when registering HMM data learned from the characteristic amount of the voice component of the password in the database 140; a characteristic extraction unit 130 that extracts a characteristic amount from the voice component of the input password; a likelihood calculation unit 520 that compares the characteristic amount of the HMM data that was learned and generated from the extracted characteristic amount with the characteristic amount so all of the HMM data for comparison, and calculates the likelihoods for the HMM data to be registered that was learned and generated from the extracted characteristic amount and for all of the HMM data for comparison; and a data generation unit 510 that uses the generated HMM data to update the database 140 when the calculated likelihoods are equal to or less than a registration judgment threshold value as a reference.

With this construction, when registering HMM data that is based on the spoken voice of a password that the operator desires to register, the speaker recognition device 500 of this embodiment calculates the likelihood of the HMM data that is learned and generated from a characteristic amount that is extracted from the spoken voice component of the input password and all of the HMM data that is registered in the database 140, and when the calculated likelihoods are less than or equal to a registration judgment threshold value, which is a reference, uses the HMM data that was generated from the characteristic amount of the spoken voice component of the password to be registered and updates the database 140.

Also, as in the first embodiment, the speaker recognition device 500 of this embodiment deletes the registration of data such as HMM data that is based on a characteristic amount for which recognition errors could occur easily when recognizing the operator, thus the possibility of errors in recognitions are decreased and it is possible to provide stable recognition performance.

Also, in this embodiment, when the registration judgment unit 160 determines that registration is not allowed, the password to be registered must be input again, and an instruction is given to the operator to input the password to be registered again until the registration judgment unit 160 allows registration, however, it is also possible to set a limit on the number of times that the password can be input again.

In this case, the system control unit 530 stores the calculated maximum likelihood in ROM/RAM 250 each time when performing the instruction to change the password, and when registration of the password to be registered is not allowed even though the password has been re-input the preset number of times, for example, the system control unit 530 selects the password that has the smallest likelihood of the maximum likelihoods that are stored in the ROM/RAM 250 that functions as the memory means of this invention, and has the data generation unit 510 use the HMM data of the selected password that was generated based on the characteristic amount of the input spoken voice to update the database 140. Also, in this case, each time the password to be registered is input, the system control unit 530 instructs the operator by way of the display unit 170 and speaker 190 to input the spoken voice a plurality of times. Therefore, by limiting the re-input of the password in this way, it is possible to reduce the burden on the operator during the registration process. Also, in this case, the recognition process threshold value is changed based on the likelihood that is calculated when performing registration judgment of the password that is the object of registration, or in other words, based on a maximum likelihood having a value larger than the registration judgment threshold value. For example, in this case, the system control unit 530 calculates a recognition process threshold value that has a value that is larger than the maximum likelihood and stores that threshold value in the recognition processing unit 220.

Also, as described above, instead of limiting the input of the spoken voice of the password, together with storing the calculated maximum likelihoods in ROM/RAM 250, when the maximum likelihood of the previously input password is greater than the maximum likelihood of the password that was input the present time, the HMM data that was generated based on the spoken voice of the password input the previous time can be used to update the database 140. By limiting the re-input of the password according to a specified standard in this way, it is possible to reduce the burden on the operator during the registration process. Also, in this case, the recognition process threshold value changes based on the likelihood that is calculated when performing registration judgment of the password that is the object of registration, or in other words, based on the maximum likelihood having a value greater than the registration judgment threshold value. For example, in this case, the system control unit 530 calculates a recognition process threshold value that as a specified value larger than the maximum likelihood, and stores the value in the recognition processing unit 220.

In the embodiments described above, cases in which voice component information and fingerprint information were used as biological information were explained, however, biological information includes any information that can be obtained from a biological body and that can be used for identifying an individual such as a face image, palm image, finger image, iris information, vein information or the like.

This invention is not limited to the embodiments described above. The embodiments described above are examples, and have essentially the same construction as the technical idea disclosed in the claims of the invention, and any other embodiments having similar effect are considered to be within the technical scope of the invention.

Japanese patent application (No. 2005-101369), including the specification, claims, drawings and abstract, which was submitted on Mar. 31, 2005 is included here in it entirety as a reference.

What is claimed is:

1. An operator recognition device having a database in which biological information for comparison, for which registration can be changed and that is obtained from biological information for each operator that is the object of recognition, is registered in advance, and that recognizes an operator by comparing biological information of the operator to be identified with the biological information for comparison, comprising:

an input device for inputting biological information to be registered when registering the biological information in the database as biological information for comparison;

a comparison-target information generation device for generating comparison-target information for comparison with the biological information for comparison that is registered in the database based on input biological information to be registered when registering the biological information in the database as biological information for comparison;

a calculation device for comparing the generated comparison-target information and all of the biological information for comparison, and calculating likelihoods for both the generated comparison-target information and all of the biological information for comparison;

a notification device for notifying the operator to re-input biological information having a characteristic amount that is different than that of the input biological information when at least one of the calculated likelihoods is greater than a reference likelihood;

a memory device for temporarily storing the input biological information, and storing at least the maximum likelihood of the likelihoods that are greater than the reference likelihood for each input biological information; and an update device for registering biological information that has the minimum maximum likelihood of the maximum likelihoods of the stored biological information, as the biological information for comparison, in the database, when the biological information is re-input a preset number of times, and when the likelihood that is based on any of the input biological information is greater than the reference likelihood.

2. An operator recognition device having a database in which biological information for comparison, for which registration can be changed and that is obtained from biological information for each operator that is the object of recognition, is registered in advance, and that recognizes an operator by comparing biological information of the operator to be identified with the biological information for comparison, comprising:

an input device for inputting biological information to be registered when registering the biological information in the database as biological information for comparison;

a comparison-target information generation device for generating comparison-target information for comparison with the biological information for comparison that is registered in the database based on biological information that was input to the input device;

a calculation device for comparing the generated comparison-target information and all of the biological information for comparison, and calculating likelihoods for both the generated comparison-target information and all of the biological information for comparison;

a notification device for notifying the operator to re-input biological information having a characteristic amount that is different than that of the input biological information when at least one of the calculated likelihoods is greater than a reference likelihood;

a memory device for temporarily storing the input biological information, and for storing at least the maximum likelihood of the likelihoods that are greater than the reference likelihood for each input biological information; and an update device for registering biological information that was input the previous time when the biological information is re-input, and when the maximum likelihood of the biological information, as the biological information for comparison, in the database, that was input the present time is greater that the maximum likelihood of the biological information that was input the previous time.

3. The operator recognition device of claim 1, wherein the comparison-target information generation device extracts a characteristic amount, which is the comparison-target information, from the biological information that was input to the input device;

the calculation device compares the extracted characteristic amount with characteristic amounts of each of the biological information for comparison, and calculates the likelihood for both the extracted characteristic amount and characteristic amounts of each of the biological information for comparison; and the update device generates the biological information for comparison based on the comparison-target information, and uses the generated biological information for comparison to update the database.

4. The operator recognition device of claim 1, further comprising:

an extraction device for extracting a characteristic amount from biological information that is input from the input device; wherein the comparison-target information generation device generates the biological information for comparison as the comparison-target information based on the extracted characteristic amount;

the calculation device compares the characteristic amount of the generated biological information for comparison and the characteristic amounts of all the biological information for comparison and calculates the likelihoods for both the characteristic amount of the generated biological information for comparison and the characteristic amounts of all of the biological information for comparison; and the update device updates uses the generated biological information for comparison to update the database.

5. The operator recognition device of claim 3, wherein the biological information for comparison that is used for updating the database is generated based on the characteristic amount that is extracted from the same biological information that is input to the input device a plurality of times by the same operator.

6. The operator recognition device of claim 1, wherein when the same biological information for the same operator is input to the input device a plurality of times, and the biological information for comparison, which is generated based on that same biological information that is input a plurality of times is registered in the database, the comparison-target information generation device extracts a characteristic amount, which is the comparison-target information, from biological information that is input the first time to the input device; and the calculation device calculates the likelihood for both the characteristic data that was extracted from the biological information that was input the first time, and each of the characteristic amounts of biological information for comparison; and only when the calculated likelihoods that are based on the biological information that was input first is equal to or less than a reference likelihood, the update device generates one item of the biological information for comparison based on each of the characteristic amounts that are extracted from the same biological information that was input the first time, and updates the database using that generated biological information for comparison.

7. The operator recognition device of claim 1, wherein voice component information that indicates information for the voice component of a specified password for each the operator is registered as the biological information for comparison in the database; and the voice component information when the operator speaks a specified password is input to the input device as the biological information.

8. The operator recognition device of claim 1, wherein fingerprint information that indicates information for a specified fingerprint of each of the operators is registered in the database as fingerprint information; and the fingerprint information of the operator is input to the input device as the biological information.

9. An operator recognition method for recognizing an operator by comparing biological information for comparison for which registration can be changed and that is obtained from biological information that is registered in a database in advance for each operator that will be the object of recognition, and biological information of an operator to be identified, comprising:

a comparison-target information generation process of generating comparison-target information for comparison with the biological information for comparison that is registered in the database based on input biological information to be registered when registering the biological information in the database as biological information for comparison;

a calculation process of comparing the generated comparison-target information and all of the biological information for comparison, and calculating likelihoods for both the generated comparison-target information and all of the biological information for comparison;

a notification process of notifying the operator to re-input biological information having a characteristic amount that is different than that of the input biological information when at least one of the calculated likelihoods is greater than a reference likelihood;

a memory process of temporarily storing the input biological information, and storing at least the maximum likelihood of the likelihoods that are greater than the reference likelihood for each input biological information; and an update process of registering biological information that has the minimum maximum likelihood of the maximum likelihoods of the stored biological information, as the biological information for comparison, in the database, when the biological information is re-input a preset number of times, and when the likelihood that is based on any of the input biological information is greater than the reference likelihood.

10. An operator recognition method for recognizing an operator by comparing biological information for comparison for which registration can be changed and that is obtained from biological information that is registered in a database in advance for each operator that will be the object of recognition, and biological information of an operator to be identified, comprising:

a comparison-target information generation process of generating comparison-target information for comparison with the biological information for comparison that is registered in the database based on input biological information to be registered when registering the biological information in the database as biological information for comparison;

a calculation process of comparing the generated comparison-target information and all of the biological information for comparison, and calculating likelihoods for both the generated comparison-target information and all of the biological information for comparison;

a notification process of notifying the operator to re-input biological information having a characteristic amount that is different than that of the input biological information when at least one of the calculated likelihoods is greater than a reference likelihood;

a memory process of temporarily storing the input biological information, and storing at least the maximum likelihood of the likelihoods that are greater than the reference likelihood for each input biological information; and an update process of registering biological information that was input the previous time when the biological information is re-input, and when the maximum likelihood of the biological information, as the biological information for comparison, in the database, that was input the present time is greater that the maximum likelihood of the biological information that was input the previous time.

11. A non-transitory recording medium having recorded thereon an operator recognition program for recognizing an operator by a computer by comparing biological information for comparison, for which registration can be changed and that is found from biological information that is registered in advance for each operator that is the object of recognition, with biological information for an operator that is to be identified, and that makes the computer function as:

a comparison-target information generation device for generating comparison-target information for comparison with'the biological information for comparison that is registered in the database based on input biological information to be registered when registering the biological information in the database as biological information for comparison;

a calculation device for comparing the generated comparison-target information and all of the biological information for comparison, and calculating likelihoods for both the generated comparison-target information and all of the biological information for comparison;

a notification device for notifying the operator to re-input biological information having a characteristic amount that is different than that of the input biological information when at least one of the calculated likelihoods is greater than a reference likelihood;

a memory device for temporarily storing the input biological information, and storing at least the maximum likelihood of the likelihoods that are greater than the reference likelihood for each input biological information; and an update device for registering biological information that has the minimum maximum likelihood of the maximum likelihoods of the stored biological information, as the biological information for comparison, in the database, when the biological information is re-input a preset number of times, and when the likelihood that is based on any of the input biological information is greater than the reference likelihood.

12. A non-transitory recording medium having recorded thereon an operator recognition program for recognizing an operator by a computer by comparing biological information for comparison, for which registration can be changed and that is found from biological information that is registered in advance for each operator that is the object of recognition, with biological information for an operator that is to be identified, and that makes the computer function as:

a comparison-target information generation device for generating comparison-target information for comparison with the biological information for comparison that is registered in the database based on input biological information to be registered when registering the biological information in the database as biological information for comparison;

a calculation device for comparing the generated comparison-target information and all of the biological information for comparison, and calculating likelihoods for both the generated comparison-target information and all of the biological information for comparison;

a notification device for notifying the operator to re-input biological information having a characteristic amount that is different than that of the input biological information when at least one of the calculated likelihoods is greater than a reference likelihood;

a memory device for temporarily storing the input biological information, and storing at least the maximum likelihood of the likelihoods that are greater than the reference likelihood for each input biological information; and an update device for registering biological information that was input the previous time when the biological information is re-input, and when the maximum likelihood of the biological information, as the biological information for comparison, in the database, that was input the present time is greater that the maximum likelihood of the biological information that was input the previous time.

* * * * *